United States Patent [19]

Vea et al.

[11] Patent Number: 4,617,427
[45] Date of Patent: Oct. 14, 1986

[54] SQUARE ROOT CIRCUIT

[75] Inventors: Mathew P. Vea, Pittsburgh, Pa.; Vinita Gupta, Menlo Park, Calif.

[73] Assignee: Northern Telecom Limited, Montreal, Canada

[21] Appl. No.: 701,288

[22] Filed: Feb. 13, 1985

[51] Int. Cl.[4] .................. H04M 1/50; G06F 15/31
[52] U.S. Cl. .................. 179/84 VF; 179/18 EB; 370/110.3
[58] Field of Search ........... 179/84 VF, 18 EB, 18 J; 370/110.3

[56] References Cited

U.S. PATENT DOCUMENTS

| | | | |
|---|---|---|---|
| 4,161,630 | 7/1979 | Bennett et al. | 179/18 EB |
| 4,203,008 | 5/1982 | Cohn-Sfetcu et al. | 179/84 VF X |
| 4,334,273 | 6/1982 | Ikeda | 179/84 VF X |
| 4,354,248 | 10/1982 | Conger et al. | 179/84 VF X |
| 4,363,100 | 12/1982 | Agnew et al. | 179/84 VF X |
| 4,528,664 | 7/1985 | Cheng et al. | 179/84 VF X |

OTHER PUBLICATIONS

Cloosen, Theo A. C. M. and Peek, J. B. H., "A Digital Receiver for Tone Detection Application", IEEE Transactions on Communication, vol. Com-24, No. 12, Dec. 1976, pp. 1291-1297.

*Primary Examiner*—James L. Dwyer
*Attorney, Agent, or Firm*—Schwartz, Jeffery, Schwaab, Mack, Blumenthal & Evans

[57] ABSTRACT

In a telephone signalling detector of the cross-correlation type, samples from a selected communications channel are multiplied with sine and cosine coefficients of different frequencies. The resulting sine and cosine products for each frequency are separately accumulated over a period of time after which the accumulated results are each squared and then summed for the individual frequencies. A series of sums of squares is compared in accordance with predetermined tone detection parameters to determine the presence or absence of a signalling tone defined by the coefficients. In a telephone signalling detector intended to detect any of a large family of specified signalling tones in any of a plurality of channels, the square root value of each of the sums of squares is typically provided by digital circuitry for subsequent use in a processor which is operated to complete the tone detection function in accordance with program instructions. A cost reduced square root circuit provides the square root values from a look-up ROM (read-only-memory) on a prompt and regular basis. In the square root circuit a large sum of squares is shifted toward lesser significance and a smaller sum of squares is shifted toward greater significance by means of a logic controlled shift register. Thereafter only a central portion of the shift register content is used along with a corresponding shift record to periodically address the look-up ROM.

6 Claims, 3 Drawing Figures

SQUARE ROOT CIRCUIT

FIELD OF THE INVENTION

The invention is in the field of calculating circuits and more particularly pertains to a circuit for calculating an approximate square root of a binary number.

BACKGROUND OF THE INVENTION

Square root calculation circuits and various uses of same are well documented. One such use is in telephone signalling receivers wherein tone detection is achieved by cross-correlation. One example of such a receiver is that described by Theo A. C. M. Cloosen and J. B. H. Peek in a publication of IEEE Transactions on Communication, Vol. Com-24, No. 12, December 1976 and entitled "A Digital Receiver for Tone Detection Application". Traditionally in telephone systems the telephone digit receiver is connected to service a calling telephone set during a primary signalling dialling portion of a telephone call progress. Once digits of a directory number have been received the digit receiver has traditionally been released so that it is free to be utilized during other call progresses as these occur. Recently expanded telephone services, for example voice messaging, have been introduced in some telecommunications systems. Various features of the voice messaging service are activated subsequent to the primary signalling or dialling portions of a call progress by yet further pushbutton generated dialling. This subsequent dialling is usually referred to as secondary signalling. Therefore in a telephone exchange having one or more such features, it is essential that each telephone call be monitored throughout its entirety, firstly for a short time for primary signalling and subsequently for the remainder of the call for secondary signalling. Consequently the cost of providing sufficient receivers in switching exchanges which are intended to accept secondary signalling has multiplied in comparison to those switching exchanges which accept only primary signalling.

Dramatic cost reductions in receivers have been achieved by speeding up the digit receiver function so that a digit receiver may be time shared among a plurality of active telephone calls. One example of a fast digit receiver is that disclosed by D. G. Agnew et al in U.S. Pat. No. 4,363,100 issued Dec. 7, 1982 and in Canadian Pat. No. 1,145,848 issued May 3, 1983. These patents are each entitled "Detection of Tones in Sampled Signals". The disclosed receiver produces a signal at its output which is porportional to a square root of a sum of two signals from respective branches of a time shared fast digital correlator circuit. The output signal is thus in a preferred reduced form for processing by a microcomputer suitably programmed for the signalling receiver function.

SUMMARY OF THE INVENTION

It is an object of the invention to provide a number conversion circuit adapted to generating approximate square root values from sums of corresponding signals as typically generated in respective branches of a digital correlation tone detector. More particularly it is an object of the invention to provide a cost reduced square root calculating circuit wherein each square root result is quickly available from a look-up table of reduced size and cost.

A number conversion circuit in accordance with the invention includes a shift register for capturing an input binary number having n bits at corresponding ones of n shift register stages. The shift register is controllable to serially shift the bits of the captured binary number in directions of greater and lesser significance to provide a registered binary number. A logic circuit is connected to control the shift register in response to the content thereof such that:

(a) in a first case wherein any of m most significant stages is asserted, the binary number is shifted in the direction of lesser significance until each of the m most significant stages is unasserted; and (b) in a second case wherein none of m+1 most significant stages is asserted, the binary number is shifted in the direction of greater significance until the $(n-m-1)^{th}$ most significant stage becomes asserted or until a predetermined limit number of shifts has occurred.

The logic circuit also provides a plural bit shift record in coincidence with the resultant registered binary number. The look-up table includes an address port connected to be addressed by the plural bit shift record in combination with the binary number as it is ultimately registered in those stages of the shift register being bounded by and including the $(n-m-1)^{th}$ most significant stage and a least significant stage corresponding to the predetermined limit number such that the address applied at the address port consists of fewer than said n bits.

BRIEF DESCRIPTION OF THE DRAWINGS

An example embodiment is described with reference to the accompanying drawings in which:

FIG. 3 is a prior art tone detector.

DESCRIPTION OF THE EXAMPLE EMBODIMENT

Figure 1:
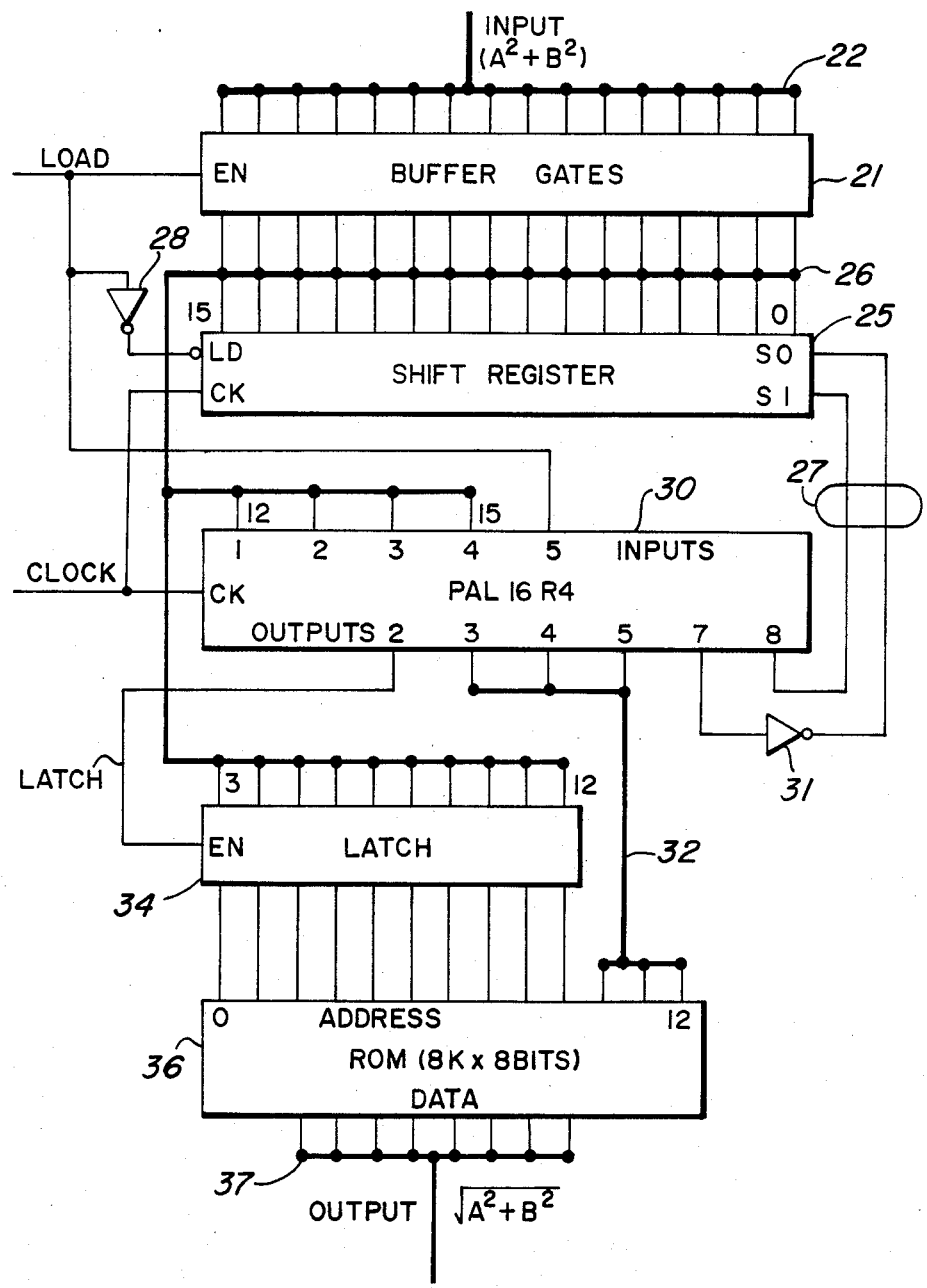
FIG. 1 is a block schematic diagram of a square root circuit suitable for use in a cross-correlation tone detector in accordance with the inventon.

In the square root circuit in FIG. 1, buffer gates 21, a bidirectional shift register 25, a shift logic circuit 30, a latch 34 and a look-up table ROM (read-only-memory) 36 are connected as shown. Provisions for power and ground are not shown as these are well understood by persons of typical knowledge in electronic technology. Similarly circuit means for providing CLOCK and LOAD timing signals as illustrated in FIG. 2 are not shown as these means are also well understood.

Figure 2:
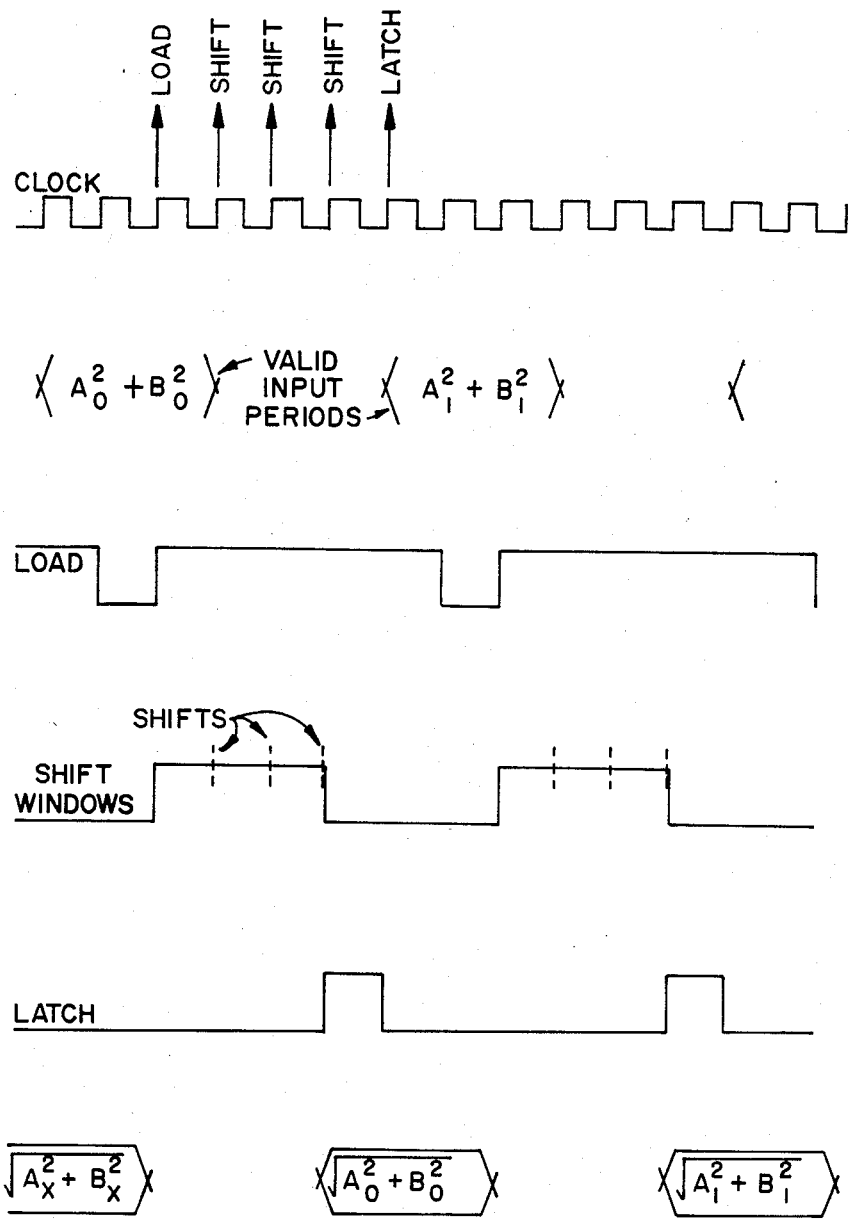
FIG. 2 is a timing and waveform diagram which is representative of various functions in the operation of the square root circuit in FIG. 1.

In the operation of the square root circuit, sixteen bit binary numbers representative of cross-correlation results of accumulated sums of squared sine and cosine products from a tone detector appear on an input bus 22 from time to time at valid input periods as exemplified in FIG. 2. The signal states of the input bus 22 are applied to a register bus 26 via the buffer gates 21 under the control of the LOAD timing signal on a LOAD lead. The LOAD timing signal is also applied to the shift logic circuit 30 and via an inverter 28 to the shift register 25. The signal states of the register bus leads RBL 0-15 are stored by corresponding stages of the shift register 25 at the moment of a rising edge of CLOCK timing signal coincident with the trailing edge of one of the LOAD pulses. At the same time the shift logic circuit 30 is initiated by the LOAD timing signal so that at each of the next three rising edges of the CLOCK timing signal the shift register 25 is caused to shift as required, via shift control leads 27 and an inverter 31, in order to meet the following criteria:
(1) Shift right if: RBL15=1 or RBL14=1 or RBL13=1, until RBL15=RBL14=RBL13=0
(2) Shift left if: RBL15=RBL14=RBL13=RBL12=0 until RBL12=1 or until three shifts are completed, whichever occurs first.
(3) No shift if: RBL15=RBL14=RBL13=0 and RBL12=1

These shifts occur as required under the control of the logic circuit 30 during the time of a shift window as illustrated in FIG. 2. A pair of integrated circuits type SN74S299 may be used to provide the shift register 25 and an integrated circuit type PAL16R4 in combination with an inverter 31 as shown provides the logic circuit 30 for operation in accordance with the following Table.

| Function | Control Inputs | | |
| --- | --- | --- | --- |
|  | S1 | S0 | CK |
| Load | Hi | Hi | Rising |
| Shift Left | Hi | Lo | Rising |
| Shift Right | Lo | Hi | Rising |
| Hold | Lo | Lo | — |

The above listed criteria (1), (2), and (3) once fulfilled yield seven possible shift histories which are encoded in three binary bits by the logic circuit 30 and applied at address port positions 10-12 of the look-up table ROM 36. At the same time the signal state of RBLs 3-12 are loaded into the latch 34 under the control of the shift logic circuit 30 and thereafter are applied at the address port positions 0-9 of the look-up table ROM 36. The required function of the input binary number of sixteen bits is provided from the ROM 36 on an output bus 37. The time taken to determine the value of the function is consistently short being only three pulses of the CLOCK timing signal plus propagation delay through ROM 36, after the input binary number is captured in the shift register 25. As illustrated in FIG. 2 the output of the ROM 36 is conveniently available on a regular basis for use in the cross-correlation signalling detector. The circuit in FIG. 2 thus provides an eight bit square root of sixteen bit number with thirteen bit addressable ROM 36 without loss of accuracy.

Although the circuit function and structure of the example embodiment are directed to rapid and efficient approximate square root determination for cross-correlation signalling detection, the invention herein exemplified is also useful for many look-up table implementable functions as will come to mind of those persons skilled in the art in view of the preceding description.

What is claimed is:

1. A number conversion circuit which includes a look-up means for providing an output number representing a predetermined function of an input binary number having n bits, the number conversion circuit comprising:
a shift register for capturing the n bits of the input binary number at corresponding ones of n register stages, the shift register being controllable to serially shift the bits of the captured binary number in directions of greater and lesser significance to provide a registered binary number;
logic means being connected to control the shift register in response to the content thereof such that:
(a) in a first case wherein any of m most significant stages is asserted, the binary number is shifted in the direction of lesser significance until each of the m most significant stages is unasserted; and
(b) in a second case wherein none of m+1 most significant stages is asserted, the binary number is shifted in the direction of greater significance until the $(n-m-1)^{th}$ most significant stage becomes asserted or until a predetermined limit number of shifts has occurred,
the logic means also being for providing a plural bit shift record in coincidence with the registered binary number;
the look-up means including an address port being connected to the shift register and to the logic means for being addressed by the plural bit shift record in combination with the binary number as it is ultimately registered in three stages of the shift register being bounded by and including the $(n-m-1)^{th}$ most significant stage and the least significant stage corresponding to the predetermined limit number,
whereby the address applied at the address port consists of fewer than said n bits.

2. A number conversion circuit as defined in claim 1 wherein the look-up means comprises a read-only-memory (ROM) so arranged as to provide a root of the registered binary number.

3. A number conversion circuit as defined in claim 2 wherein the look-up means further comprises a register having inputs connected to stages of the shift register and outputs connected to an address port of the ROM, the register being responsive to the logic means for storing the most recently registered binary numbers and for applying the stored binary number to the address port of the ROM.

4. A number conversion circuit as defined in claim 1 wherein the square root of the binary input number is provided, wherein the input binary number is of at most sixteen significant bits, and wherein m and the predetermined limit are both equal to 3.

5. A telephone signalling tone detector circuit for detecting predetermined tone signals in a plurality of pulse code modulated (PCM) communication channels, including: means for selecting signal samples from the communication channels for which tone detection is required, means for generating sine and cosine products corresponding to each tone to be detected in each selected sample, means for generating a sum of squares of each of the corresponding sine and cosine products, means for generating a square root value for each of the sums of squares and processor means for identifying tone signalling on a basis of a series of related square root values meeting predetermined parameters, being characterized in that:
each of the sum of squares is a binary number having been generated with at most sixteen significant bits and each of the corresponding square root values is of at most eight significant bits being read from a ROM which is addressable by at most less than sixteen bits, the means for generating the square root values comprising:
a shift register for capturing the bits of the binary number at corresponding register stages, the shift register being controllable to serially shift the bits of the captured binary number in directions of greater and lesser significance to provide a registered binary number;

logic means being connected to control the shift register in response to the content thereof such that:

(a) in a first case wherein any of three most significant stages is asserted, the binary number is shifted in the direction of lesser significance until each of the three most significant stages is unasserted, and (b) in a second case wherein none of the four most significant stages is asserted, the binary number is shifted in the direction of greater significance until the fourth most significant stage becomes asserted or until a predetermined limit number of three shifts has occurred, the logic means also being for providing a plural bit shift record in coincidence with the registered binary number;

the ROM including an address port for receiving addresses each consisting of the plural bit shift record in combination with the binary number as it is ultimately registered in stages of the shift register being bounded by and including the fourth most significant stage and the fourth least significant stage.

6. A telephone signalling tone detector circuit as defined in claim 5 further comprising:

latch means being provided by a register being responsive to the logic means for simultaneously storing the most recently registered binary number and applying the stored number to the address port of the ROM.

* * * * *